United States Patent [19]
Beutel et al.

[11] 3,896,190
[45] July 22, 1975

[54] SULFUROUS PHOSPHORIC AND PHOSPHONIC ESTERS

[75] Inventors: Peter Beutel, Mannheim; Heinrich Adolphi, Limburgerhof; Karl Kiehs, Lampertheim, all of Germany

[73] Assignee: BASF Aktiengesellschaft, Ludwigshafen (Rhine), Germany

[22] Filed: Oct. 10, 1973

[21] Appl. No.: 405,157

[30] Foreign Application Priority Data
Oct. 12, 1972 Germany............................ 2249939

[52] U.S. Cl............ 260/945; 260/247.1; 260/268 S; 260/293.85; 260/320.82; 424/200; 424/211
[51] Int. Cl. ........ C07f 9/16; C07f 9/38; A01n 9/36
[58] Field of Search .................................... 260/945

*Primary Examiner*—Anton H. Sutto
*Attorney, Agent, or Firm*—Johnston, Keil, Thompson & Shurtleff

[57] ABSTRACT

New and valuable sulfurous phosphoric ester derivatives and a process for controlling pests with these compounds.

2 Claims, No Drawings

SULFUROUS PHOSPHORIC AND PHOSPHONIC ESTERS

The present invention relates to new sulfurous phosphoric and phosphonic esters and their use as pesticides.

It is known to use phosphoric esters and methyl carbamates as insecticides. However, pests which have developed a resistance to these active ingredients are on the increase.

We have now found that phosphoric ester derivatives of the formula

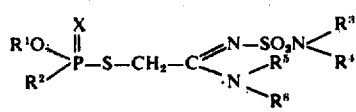

where $R^1$ denotes methyl or ethyl, $R^2$ denotes methyl, ethyl, phenyl, methoxy or ethoxy, $R^3$ denotes alkyl of a maximum of 3 carbon atoms (methyl, ethyl, n-propyl, isopropyl), $R^4$ denotes hydrogen, alkyl of a maximum of 3 carbon atoms (methyl, ethyl, n-propyl, isopropyl) or phenyl, or $R^3$ and $R^4$ together with the nitrogen atom whose substituents they are denote a pyrrolidine, piperidine, morpholine, piperazine or N-alkyl piperazine ring, $R^5$ denotes alkyl of a maximum of 3 carbon atoms (methyl, ethyl, n-propyl, isopropyl), $R^6$ denotes methyl, ethyl or phenyl and X denotes oxygen or sulfur, have excellent acaricidal and insecticidal properties. They have a very good action not only on biting and sucking insects, but also on mites. Phytotoxicity is low. The action sets in rapidly and lasts for a long time. For this reason the compounds of the invention may be successfully used in the plant protection sector for combatting injurious sucking and biting insects and Diptera, and for combatting Acarina in the plant protection and veterinary sectors. Of special importance in this connection is the excellent action of the compounds on strains of mites which are resistant to phosphoric esters.

The main members of the group of sucking insects are aphids such as the green peach aphid (*Myzus persicae*) and the bean aphid (*Doralis fabae*); scales, such as *Aspidiotus hederea, Lecanium hesperidum, Pseudococcus maritimus*; Thysanoptera, such as *Hercinothrips femoralis*; and bugs, such as *Piesma quadrata* and the bed bug (*Cimex lectularius*).

The main members of the group of biting insects are caterpillars, such as *Plutella maculipennis* and *Lymantria dispar*; beetles, such as the granary weevil (*Sitophilus granarius*), Colorado potato beetle (*Leptinotarsa decemlineata*), and also types living in the soil, e.g., wireworms (*Agriotes sp.*) and cockchafer (*Melolontha melolontha*); bugs, such as the croton bug (*Blattela germanica*); Orthoptera, such as the house-cricket (*Gryllus domesticus*); termites, such as Reticulitermes; and Hymenoptera, such as ants.

The Diptera include in particular the flies, e.g., fruit fly (*Drosophila melanogaster*); Mediterranean fruit fly (*Ceratitis capitata*); housefly (*Musca domestica*); gnats such as the yellow fever mosquito (*Aedes aegypti*) and *Culex pipilus*; blue-bottles, such as *Lucilia sericata*; and blowflies (*Chrysomya chloropyga*).

Of the mites, the following are of particular importance: Tetranychidae, such as the red spider mite (*Tetranychus urticae*) and *Paratetranychus pilosus*; gall mites, such as the currant mite (*Eriophyes ribis*) and Tarsonemidae, such as *Tarsonemus pallidus*.

Application of the compounds is by conventional methods, e.g., spraying, atomizing, fuming, broadcasting, etc.

The new active ingredients may be prepared from the appropriately substituted chloroacetic amidines in accordance with the following equation:

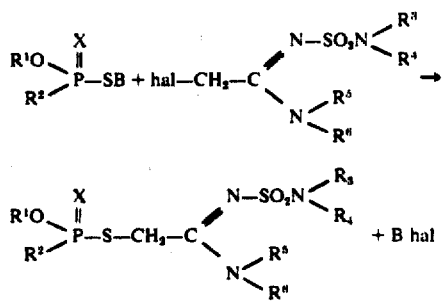

where $R^1$ to $R^6$ and X have the above meanings, hal denotes chloro, bromo or iodo and B denotes any organic or inorganic cation (e.g. $Na^+$, $K^+$, $NH_4^+$, $(C_2H_5)_2NH_2^+$, $(C_2H_5)_3NH^+$).

Examples of suitable solvents for the reaction are cyclic or acyclic ethers such as dioxane, tetrahydrofuran, ethylene glycol dimethyl ether and diethylene glycol dimethyl ether; ketones such as acetone and methyl ethyl ketone; hydrocarbons, e.g. benzene, toluene, xylene; and chlorinated hydrocarbons, e.g. chloroform, carbon tetrachloride, chlorobenzene. The reaction may also be carried out in water or mixtures of water and any of the abovementioned water-miscible or water-immiscible solvents.

The reaction may be carried out at from 0° to 150°C, preferably 60° to 100°C. The haloacetamidines substituted as mentioned above are prepared for instance by the following reaction:

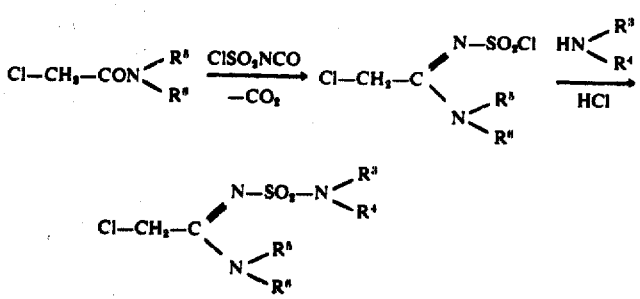

(cf. Angew. Chem., 80, 179, 1968). The radicals $R^3$ to $R^6$ have the abovementioned meanings.

EXAMPLE 1 a. Preparation of N,N-dimethyl-N'-dimethylaminosulfonyl chloroacetamidine

At 35° to 40°C and over a period of 10 minutes 117 parts (by weight) of chlorosulfonyl isocyanate is added to 101 parts of N,N-dimethylchloroacetamide and 150 parts of carbon tetrachloride. The mixture is then stirred for a further 90 minutes at 40°C until completion of the reaction. A solution of 75 parts of dimethylamine in 150 parts of dioxane is then dripped in over a period of 30 minutes at 0° to 5°C. After all has been added the mixture is stirred overnight at room temperature.

The contents of the flask are filtered and the filtrate is concentrated. The residue is dissolved in chloroform, washed twice with water, dried over sodium sulfate and concentrated.

Yield: 75 to 85%; m.p.: 76° to 78°C.

b. Preparation of S-(O,O-diethylthiophosphoryl)-N,N-dimethyl-N'-dimethylaminosulfonylthiolglycolic amidine At 40° to 60°C and over a period of 1 hour, 1,024 parts of N,N-dimethyl-N'-dimethylaminosulfonyl chloroacetamidine is added in portions to a solution of 955 parts of ammonium-O,O-diethyldithiophosphate in 2,000 parts of dioxane and 400 parts of water. The mixture is then stirred for 4 hours at 70°C. The contents of the flask are cooled and diluted with about 1,000 parts of water. The product is suction filtered and washed two to four times with water to remove the inorganic impurities.

Yield: 100%; m.p. 46° to 48°C.

The following compounds may be prepared analogously:

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possible solvent.

Dusts or granules may be prepared by mixing or grinding the active ingredients with a solid carrier, e.g., kieselguhr, talc, clay or fertilizers.

EXAMPLE 2

90 parts by weight of the compound of Example 1 is mixed with 10 parts by weight of N-methyl-α-pyrrolidone. A mixture is obtained which is suitable for application in the form of very fine drops.

$$R^1O \diagdown \underset{R^2}{\overset{X}{\underset{\|}{P}}}-S-CH_2-C \diagup \overset{N-SO_2-N \diagdown \overset{R_3}{R_4}}{\underset{N \diagdown \overset{R_5}{R_6}}{}}$$

| R¹ | R² | X | R³ | R⁴ | R⁵ | R⁶ | m.p. (n_D²⁵) |
|---|---|---|---|---|---|---|---|
| C₂H₅ | C₂H₅O | O | CH₃ | CH₃ | CH₃ | CH₃ | 57° to 59°C |
| CH₃ | CH₃O | S | CH₃ | CH₃ | CH₃ | CH₃ | 91°C |
| CH₃ | CH₃O | O | CH₃ | CH₃ | CH₃ | CH₃ | 98° to 100°C |
| CH₃ | C₂H₅ | S | CH₃ | CH₃ | CH₃ | CH₃ | 81° to 83°C |
| C₂H₅ | C₂H₅ | S | CH₃ | CH₃ | CH₃ | CH₃ | 71° to 73°C |
| C₂H₅ | C₂H₅ | O | CH₃ | CH₃ | CH₃ | CH₃ | |
| CH₃ | CH₃ | S | CH₃ | CH₃ | CH₃ | C₆H₅ | |
| C₂H₅ | C₂H₅O | S | CH₃ | CH₃ | CH₃ | C₆H₅ | |
| C₂H₅ | C₂H₅O | S | C₂H₅ | C₂H₅ | CH₃ | C₆H₅ | 52° to 53°C |
| CH₃ | CH₃O | S | C₂H₅ | C₂H₅ | CH₃ | CH₃ | |
| C₂H₅ | C₂H₅O | S | C₂H₅ | C₂H₅ | CH₃ | CH₃ | (1.529) |
| C₂H₅ | C₂H₅O | S | i—C₃H₇ | i—C₃H₇ | CH₃ | CH₃ | 68° to 69°C |
| i—C₃H₇ | i—C₃H₇O | O | CH₃ | CH₃ | CH₃ | CH₃ | 81° to 83°C |
| C₂H₅ | C₂H₅O | S | CH₃ | H | C₆H₅ | C₆H₅ | |
| C₂H₅ | C₂H₅O | S | C₂H₅ | H | C₆H₅ | C₆H₅ | (1.5370) |
| C₂H₅ | C₂H₅O | S | n—C₃H₇ | H | C₆H₅ | C₆H₅ | (1.5329) |
| C₂H₅ | C₂H₅O | S | i—C₃H₇ | H | C₆H₅ | C₆H₅ | (1.5328) |
| C₂H₅ | C₂H₅O | S | C₂H₅ | C₂H₅ | C₆H₅ | CH₃ | (1.5291) |
| C₂H₅ | C₂H₅O | S | i—C₃H₇ | i—C₃H₇ | CH₃ | CH₃ | 68° to 69°C |
| C₂H₅ | C₂H₅O | S | n—C₃H₇ | n—C₃H₇ | CH₃ | CH₃ | (1.5270) |
| C₂H₅ | C₂H₅O | S | CH₂—CH-₂—CH₂——CH₂—CH₃ | CH₃ | CH₃ | | (1.5422) |
| C₂H₅ | C₂H₅O | S | CH₂—CH-₂—O—CH₂——CH₃ | | C₂H₅ | C₂H₅ | 102° to 103°C |
| C₂H₅ | C₂H₅O | S | CH₃ | C₆H₅ | CH₃ | CH₃ | (1.5698) |
| C₂H₅ | C₂H₅O | S | C₂H₅ | C₂H₅ | CH₃ | C₆H₅ | 52° to 53°C |
| C₂H₅ | C₂H₅O | S | i—C₃H₇ | i—C₃H₇ | CH₃ | C₆H₅ | |
| C₂H₅ | C₂H₅O | S | n—C₃H₇ | n—C₃H₇ | CH₃ | C₆H₅ | |
| C₂H₅ | C₂H₅O | S | CH₂—CH-₂—CH₂——CH₂—CH₃ | | CH₃ | C₆H₅ | 110° to 111°C |
| C₂H₅ | C₂H₅O | S | n—C₃H₇ | n—C₃H₇ | i—C₃H₇ | C₆H₅ | 82° to 83°C |
| C₂H₅ | C₂H₅O | S | C₂H₅ | C₂H₅ | i—C₃H₇ | C₆H₅ | 71° to 75°C |
| C₂H₅ | C₂H₅O | S | i—C₃H₇ | i—C₃H₇ | i—C₃H₇ | C₆H₅ | 86° to 88°C |
| C₂H₅ | C₂H₅O | S | i—C₃H₇ | C₆H₅ | i—C₃H₇ | C₆H₅ | |
| C₂H₅ | C₂H₅O | S | CH₃ | C₆H₅ | i—C₃H₇ | C₆H₅ | 96° to 98°C |
| C₂H₅ | C₂H₅O | S | CH₃ | CH₃ | i—C₃H₇ | C₆H₅ | 84° to 87°C |
| C₂H₅ | C₂H₅O | S | n—C₃H₇ | H | i—C₃H₇ | C₆H₅ | 72° to 74°C |

EXAMPLE 3

20 parts by weight of the compound of Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 4

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of the compound of Example 1 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of the compound of Example 1 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 7

3 parts by weight of the compound of Example 1 is intimately mixed with 97 parts by weight of particulate kaolin. A dust is obtained containing 3% by weight of the active ingredient.

EXAMPLE 8

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

The biological experiments were carried out with the following active ingredients:

For comparison purposes the following prior art compounds were used:

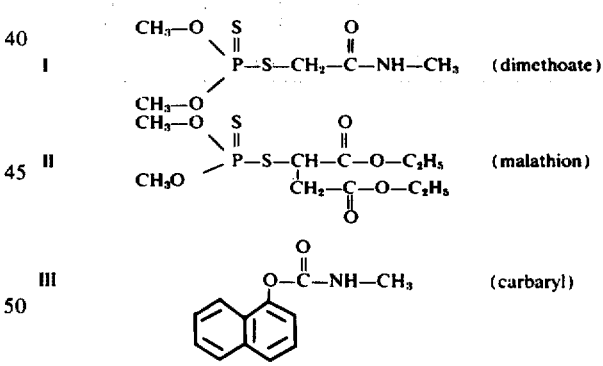

EXAMPLE 9

Action on red spider mite (*Tetranychus telarius*)

Potted bush beans are infected with a strain of Tetranychus telarius which has a high resistance to insecticides from the group of organophosphorus compounds.

10 days after having been infected the plants are sprayed with aqueous formulations of the active ingredients on a rotating table in a spray chamber. The plants are kept under greenhouse conditions for 10 days and the kill rate is then assessed.

| Active ingredient no. | | Active ingredient content in aqueous formulation in wt.% | | | |
|---|---|---|---|---|---|
| | | 0.1 | 0.02 | 0.01 | 0.005 |
| 1 | mortality (%) | 100 | 100 | 100 | 80 |
| 2 | " | 100 | 100 | 85 | |
| 3 | " | 100 | 100 | 90 | |
| 4 | " | 100 | 100 | 80 | |
| 6 | " | 100 | 100 | 80 | |
| 7 | " | 100 | 100 | 85 | |
| 8 | " | 100 | 100 | 100 | 85 |
| 9 | " | 100 | 100 | 80 | |
| 10 | " | 100 | 95 | | |
| 11 | " | 100 | 100 | 100 | 80 |
| 12 | " | 100 | 95 | | |
| 13 | " | 100 | 100 | 100 | 80 |
| 14 | " | 100 | 100 | 100 | 80 |
| 15 | " | 100 | 100 | 90 | |
| 16 | " | 100 | 100 | 100 | 90 |
| 18 | " | 100 | 100 | 80 | |
| comparative agent I | " | 85 | 20 | 0 | 0 |

EXAMPLE 10

Action on the bean aphid (*Aphis fabae*)

Potted bean plants (*Vicia faba*) suffering heavy attack from bean aphids (*Aphis fabae*) are treated as in Example 9 with aqueous emulsions of the active ingredients in a spray chamber.

The action is determined after 48 hours.

| Active ingredient no. | | Active ingredient content in emulsion in wt.% | | | |
|---|---|---|---|---|---|
| | | 0.04 | 0.02 | 0.01 | 0.005 |
| 1 | mortality (%) | 100 | 100 | 100 | 95 |
| 2 | mortality (%) | 100 | 100 | 100 | 90 |
| 3 | mortality (%) | 100 | 100 | 90 | 20 |
| 8 | mortality (%) | 100 | 95 | 40 | |
| 16 | mortality (%) | 100 | 100 | 100 | 95 |
| 18 | mortality (%) | 100 | 95 | 60 | |
| comparative agent II | mortality (%) | 100 | 80 | 30 | 0 |

EXAMPLE 11

Action on caterpillars of the cabbage moth (*Plutella maculipennis*)

Young cabbage leaves are dipped for 5 seconds into aqueous emulsions of the active ingredients. After the leaves have dried they are put in Petri dishes. Caterpillars of the cabbage moth in the 4th larval stage are then placed on the leaves.

The kill rate is determined after 48 hours.

| Active ingredient no. | | Active ingredient content of emulsion in wt.% | | | | |
|---|---|---|---|---|---|---|
| | | 0.2 | 0.1 | 0.05 | 0.025 | 0.01 |
| 1 | mortality (%) | 100 | 100 | 100 | 100 | 30 |
| 2 | mortality (%) | 100 | 100 | 100 | 30 | |
| 3 | mortality (%) | 100 | 100 | 100 | 100 | 40 |
| 4 | mortality (%) | 100 | 100 | 20 | | |
| 5 | mortality (%) | 100 | 100 | 100 | 100 | 30 |
| 16 | mortality (%) | 100 | 100 | 100 | 100 | 90 |
| 17 | mortality (%) | 100 | 100 | 100 | 100 | 40 |
| 18 | mortality (%) | 100 | 100 | 100 | 30 | |
| comparative agent III | mortality (%) | 100 | 90 | 20 | 0 | |

We claim:

1. A phosphoric ester of the formula

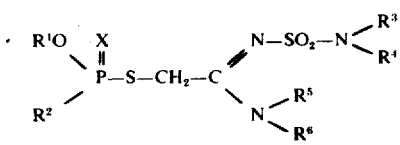

where $R^1$ denotes methyl or ethyl, $R^2$ denotes methyl, ethyl, phenyl, methoxy or ethoxy, $R^3$ denotes alkyl of a maximum of 3 carbon atoms, $R^4$ denotes hydrogen or alkyl of a maximum of 3 carbon atoms, $R^5$ denotes alkyl of a maximum of 3 carbon atoms, $R^6$ denotes methyl, ethyl or phenyl, and X denotes oxygen or sulfur.

2. S-(O,O-diethylthiophosphoryl)-N,N-dimethyl-N'-dimethylaminosulfonylthiolglycolic amidine.

* * * * *